United States Patent [19]
Mueller

[11] Patent Number: 5,203,256
[45] Date of Patent: Apr. 20, 1993

[54] CONTINUOUS FERMENTING CHAMBER FOR DOUGH PRODUCTS

[75] Inventor: Gerhard Mueller, Asperg, Fed. Rep. of Germany

[73] Assignee: Werner & Pfleiderer GmbH, Stuttgart, Fed. Rep. of Germany

[21] Appl. No.: 896,303

[22] Filed: Jun. 10, 1992

[30] Foreign Application Priority Data

Jun. 29, 1991 [DE] Fed. Rep. of Germany ....... 4121587

[51] Int. Cl.$^5$ .................... A21C 13/02; A21D 4/00
[52] U.S. Cl. ........................ 99/475; 34/204; 99/443 C; 99/476; 99/477; 126/281; 198/773; 198/775
[58] Field of Search ............ 49/443 C, 447, 352-355, 49/357, 467, 468, 477-479, 483; 34/203, 204, 207; 126/281, 21 A, 21 R; 219/388; 312/236; 198/465.3, 773, 774.1, 775; 432/128, 133, 125

[56] References Cited

U.S. PATENT DOCUMENTS

| | | | |
|---|---|---|---|
| 2,325,889 | 2/1943 | Thompson et al. | 198/775 |
| 3,343,656 | 9/1967 | Koepke, Jr. et al. | 198/773 |
| 3,802,832 | 4/1974 | Nicolaus | 432/128 |
| 3,972,277 | 8/1976 | Tamano | 99/478 |
| 3,986,446 | 10/1976 | Thompson et al. | 99/478 |
| 4,023,476 | 5/1977 | Burgess, Jr. | 99/468 |
| 4,729,470 | 3/1988 | Bacigalupe et al. | 99/479 |
| 4,882,981 | 11/1989 | Bacigalupe et al. | 99/483 |
| 5,010,808 | 4/1991 | Lanham | 34/207 |
| 5,109,758 | 5/1992 | Voegtlin | 99/443 C |
| 5,123,336 | 6/1992 | Konig | 126/21 A |

FOREIGN PATENT DOCUMENTS

| | | | |
|---|---|---|---|
| 267376 | 5/1912 | Fed. Rep. of Germany. | |
| 1017896 | 7/1955 | Fed. Rep. of Germany | 99/477 |
| 1186003 | 6/1964 | Fed. Rep. of Germany. | |
| 9012398 | 11/1990 | Fed. Rep. of Germany. | |

Primary Examiner—Timothy F. Simone

[57] ABSTRACT

A continuous operation apparatus for fermenting dough products disposed on carriers which are conveyed stepwise through a fermenting chamber by vertical and horizontal conveyors. In order to obtain maximum space utilization and product density in the fermenting chamber with vibration-free and shock-fee transfer of the carriers, a vertical transport system is provided in which several vertical pairs of columns are employed to support the carriers at successive vertically spaced levels or stages and to stepwise transport the carriers vertically. One of the columns of each pair is rotatable while the other of the columns is rotatable and vertically displaceable. The pairs of columns are provided at each stage with horizontal projections for the support of the carriers. The carriers are transported stepwise by the vertically displaceable columns and successively transferred onto the rotatable columns.

15 Claims, 4 Drawing Sheets

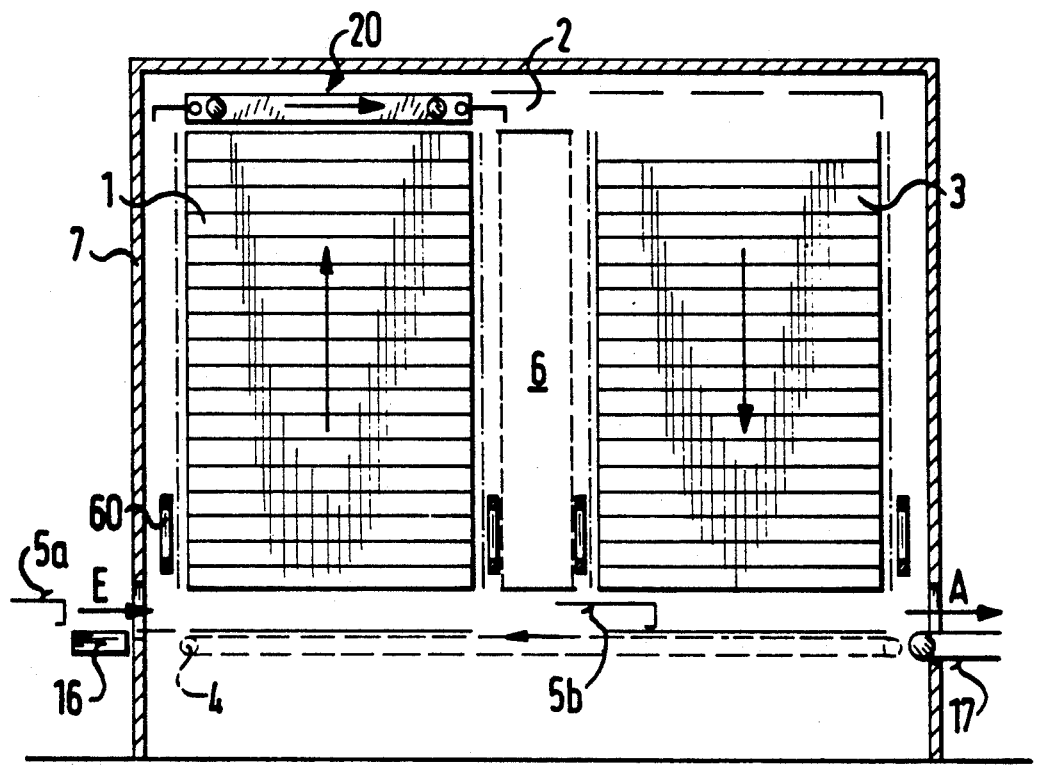
FIG. 6
FIG. 7
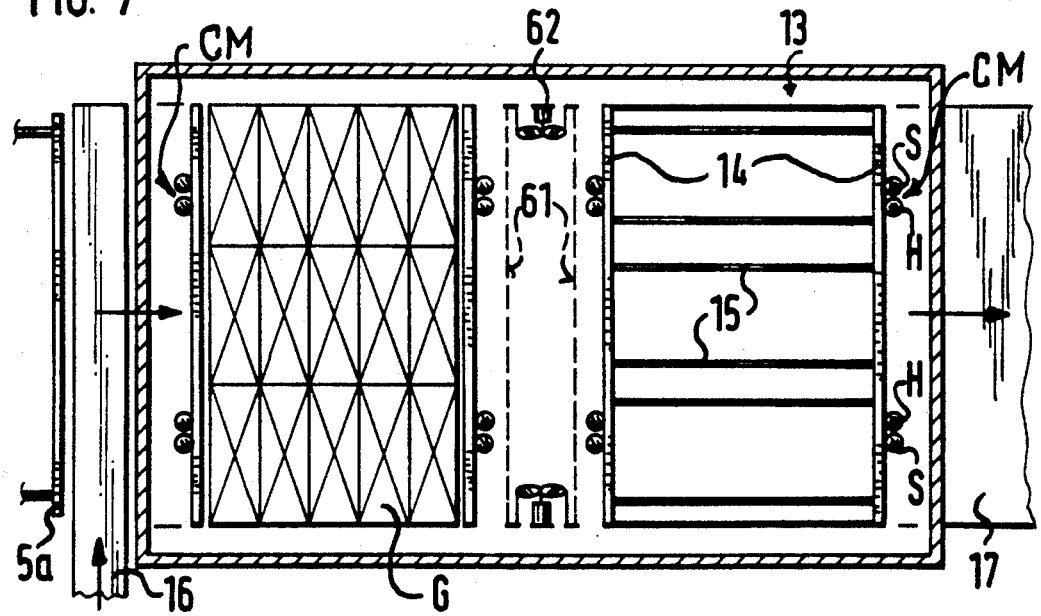

CONTINUOUS FERMENTING CHAMBER FOR DOUGH PRODUCTS

FIELD OF THE IVENTION

The invention relates to a fermenting chamber through which dough products are transported in a controlled environment prior to the baking of the dough products. In the fermenting chamber, the yeast in the dough products is caused to rise under prescribed temperature and humidity conditions.

The invention relates particularly to the transport system in the fermenting chamber by which the products are transported continuously through the chamber between an inlet and outlet therein.

BACKGROUND AND PRIOR ART

Different transport systems for dough products in fermenting chambers with endless conveyor apparatus is known (see, for example, DE GM 90 12 398), in which the carriers of the products are suspended on pairs of chains. It does not matter whether these systems employ chain-guided hinge suspensions or multi-position linear systems since all of these transport systems have the disadvantage that they require a relatively large amount of space due to the necessary chain turns. In this way, only a low product density is possible in the fermenting chamber and therefore the fermenting chamber becomes unnecessarily large and expensive and requires a great deal of space. In order to increase the product density, stacking conveyor systems are also known In DE-PS 11 86 003 the carriers are lifted by means of two chain lengths moving parallel to one another which consist of a larger outer and a smaller intermediate chain length and lifting is effected stepwise in a front section of the fermenting chamber, and after a horizontal transport at the upper end to a rear section, the carriers are lowered stepwise. In this way, a high product density is obtained at the lifting and lowering sections. Of course, several support bolts for the product carriers must remain free in the region of the upper and lower turns of the chains. Further, with this stacking system, due to the flexibility of the chain lengths, a vibration-free delivery of the very sensitive dough products at the discharge outlet, after the fermentation process has been concluded is difficult, since the same final position is not always reached exactly, and thus in the mechanical removal of the carrier to a discharge transport belt, vibrations and shocks occur. This situation occurs more often when the type of dough product is changed or there is a varying product density in the chamber. Further, chain transport systems are very material-intensive and heavy.

SUMMARY OF THE INVENTION

An object of the invention is to provide apparatus by which better utilization of space in the fermenting chamber will be obtained with a vibration and shock-free delivery of the dough products at the discharge station.

A further object of the invention is to provide in such apparatus a novel transport system to achieve the vibration and shock-free delivery of the dough products.

In order to satisfy the above objects, the invention provides a transport system which comprises first vertical conveyor means at a lifting station for lifting the dough product carriers stepwise from a lower region of the fermenting chamber to an upper region thereof, a horizontal conveyor means in the upper region for transporting the carriers from the lifting station to a lowering station, and second vertical conveyor means at the lowering station for lowering the conveyor stepwise from the upper region to the lower region.

In accordance with the invention, each of said first and second vertical conveyor means comprises a plurality of pairs of first and second rigid columns respectively including projections thereon in an arrangement so that the carriers can be supported respectively and independently by the first and second columns. The first and second columns of each pair are each selectively rotatable between respective operative positions in which the projections thereon support the carriers and inoperative positions in which the projections thereon are withdrawn from the carriers. One of the columns of each of said pairs can be raised and lowered when the projections thereon are in the operative and inoperative positions.

Stated otherwise, one of the columns of each pair is rotatable and vertically displaceable while the other of the columns is only rotatable.

The carriers are supported at each level on the projections of the columns which only rotate. The vertically displaceable columns lift the carriers off the rotatable-only columns to transport the carriers to the next level where the carriers are again transferred to the rotatable-only columns and the vertically displaceable columns are vertically displaced back to their original position.

By reason of the aforesaid transport system, a high product density is obtained with a minimum use of material. All successive levels or stages in the lifting and lowering stations can be supplied with carriers for the products. Only the stage at the inlet need be free for receiving the carriers for the goods.

As compared to conveyor systems with chains, the transport system of the invention has the considerable advantage of continuous shock-free and vibration-free delivery of the carriers for the dough products at the outlet independently of the product density and thereby of weight and load since no changes occur in the spacing of the levels or stages.

In further accordance with the invention, the columns which only rotate support the carriers on the projections thereof at the respective levels and the carriers are lifted from the projections and transported vertically to the next stage by the vertically displaceable columns. The magnitude of vertical displacement of the columns slightly exceeds the distance between the projections on the columns which facilitates the transfer of the carriers between the columns and a reliable stepwise transport and deposit of the carriers.

According to a feature of the invention, a plurality of carriers are supported at each stage in longitudinal rows in tightly packed relation.

According to a further feature of the invention, a support means for the carriers is provided in the form of a plurality of cribs at each level configured in a way to be easily transferred to and from the horizontal conveyor means at the lifting and lowering stations.

In accordance with a further feature of the invention, instead of a plurality of cribs located at each of the levels, a single pallet is employed on which the products are placed. This permits products of different shape and size to be placed onto the pallets and transported through the fermenting chamber. Moreover, when a pallet has traveled through the fermenting chamber and is at the outlet, the products can be displaced from the pallet directly onto an oven transport conveyor. The pallet is made as wide as the oven transport conveyor so that the products can be directly transferred onto the oven transport conveyor without any intermediate handling.

A feature of this embodiment is that the pallets can be doubled up at selected stages so that an intermediate space will be formed between successive stages allowing the transport of tall, relatively heavy dough products. Moreover, the doubled pallets provide the additional strength necessary for the heavier products. In this way, flat products can be transported together with tall products.

According to a further feature of the invention, the rotation of the columns is obtained by a pneumatic means in order to produce a rapid rotation of the columns, whereas the lifting of the vertically displaceable columns is effected by a hydraulic cylinder to provide reliable and uniform lifting motion for the vertical transport of the dough product carriers.

The sequencing and timing operation of the rotation and lifting of the columns is readily carried out by conventional control means and the modification of the timing sequence can be adjusted according to the fermentation requirements of the particular products.

BRIEF DESCRIPTION OF THE FIGURES OF THE DRAWING

FIG. 6 is an elevation view, partly in section, of another embodiment in which pallets are utilized for supporting the dough products.

FIG. 7 is a diagrammatic plan view, partly in section of FIG. 6.

DETAILED DESCRIPTION OF PREFERRED EMBODIMENTS

Figure 1:
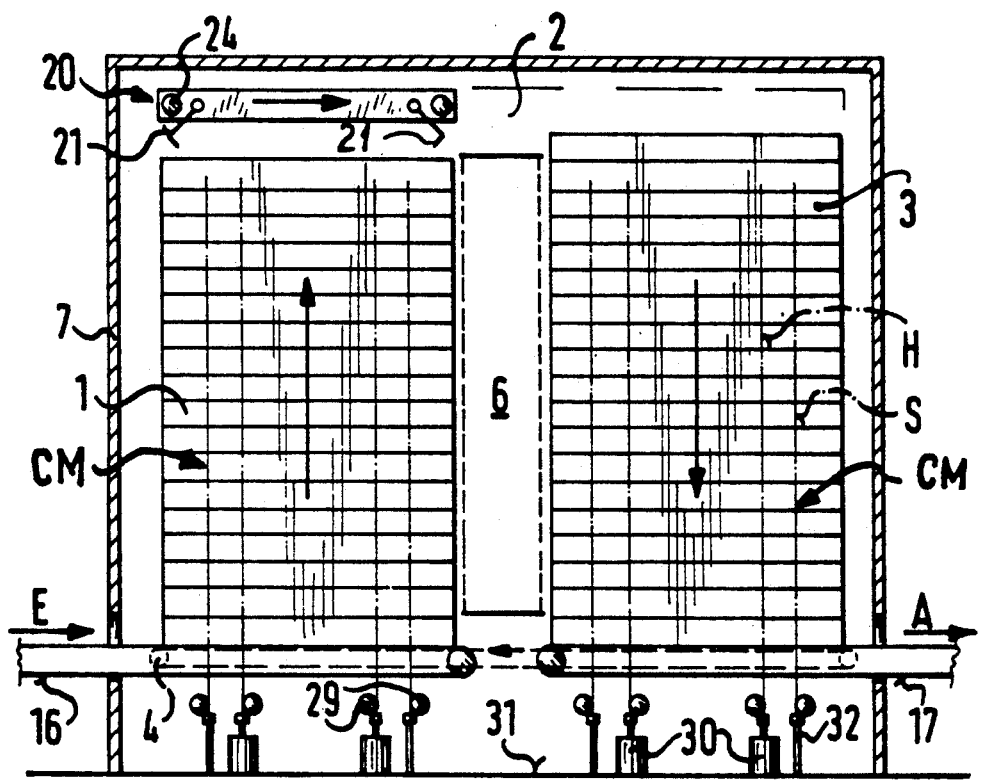
FIG. 1 is an elevational view, partly in sections, of a first embodiment of a fermenting chamber according to the invention.
Figure 2:
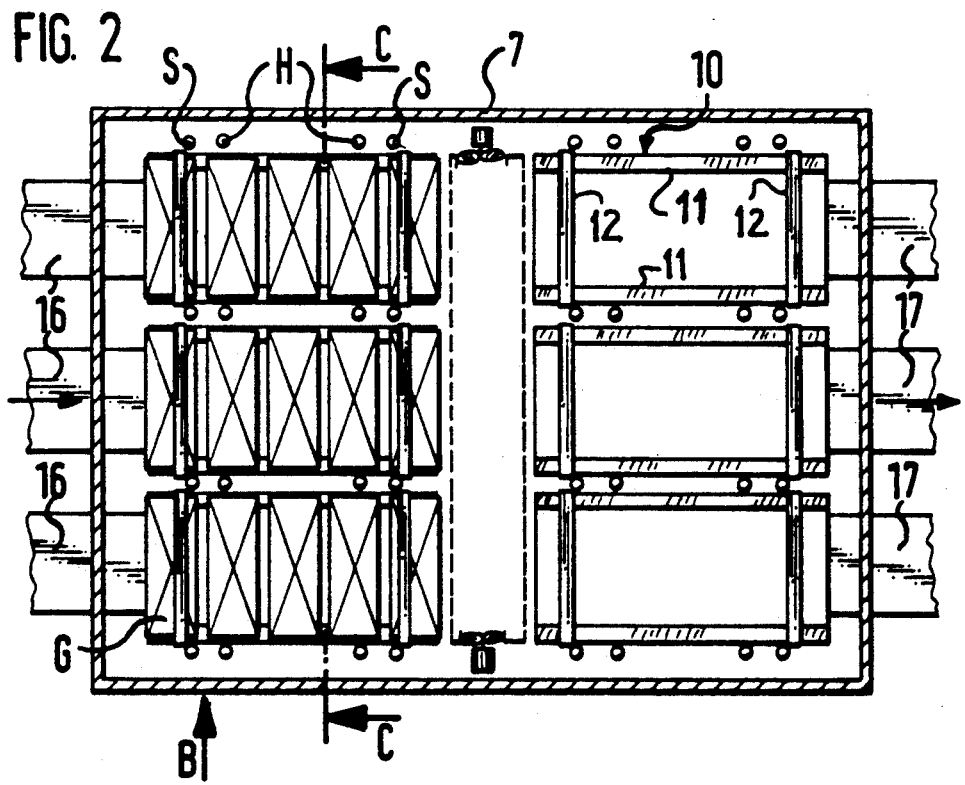
FIG. 2 is a diagrammatic plan view, partly in section, of FIG. 1.

Referring to FIGS. 1 and 2, therein is shown an embodiment of apparatus for fermenting dough products in a fermenting chamber defined in a casing 7. Carriers G on which dough products are supported are introduced into the casing 7 at an inlet E located at a front portion of the lower region of the casing 7. The carriers G are received in succession at a lifting station 1 where the carriers are lifted stepwise in the fermenting chamber from said lower region to an upper region of the fermenting chamber. A horizontal conveyor 2 is located in the upper region of the fermenting chamber to transport the carriers G horizontally, one by one, from the top of the lifting station 1 to the top of a lowering station 3. In the lowering station, the carriers G are lowered stepwise to an outlet A from which the carriers G are delivered in succession from the fermenting chamber. The lifting station 1 and lowering station 3 extend vertically in the fermenting chamber adjacent to one another and occupy a major portion of the fermenting chamber. Between the lifting and lowering stations 1 and 3 is a ventilation channel 6, defined by perforated walls 61, (FIG. 7) for controlling the climate within the fermenting chamber. A ventilator 62 (FIG. 7) is connected to channel 6. Dough products supported on the carriers G are transported continuously through the climate controlled fermenting chamber to enable the yeast in the dough products to rise so that the products are ready for subsequent baking in a baking oven (not shown).

At the lifting station 1, there is provided a vertical conveyor means CM for lifting the carriers G stepwise from the level of inlet E to the conveyor 2 at the upper region of the fermenting chamber while at lowering station 3 there is provided a similar vertical conveyor means CM for lowering the carriers G stepwise from the level of conveyor 2 to the level of outlet A.

Figure 5:
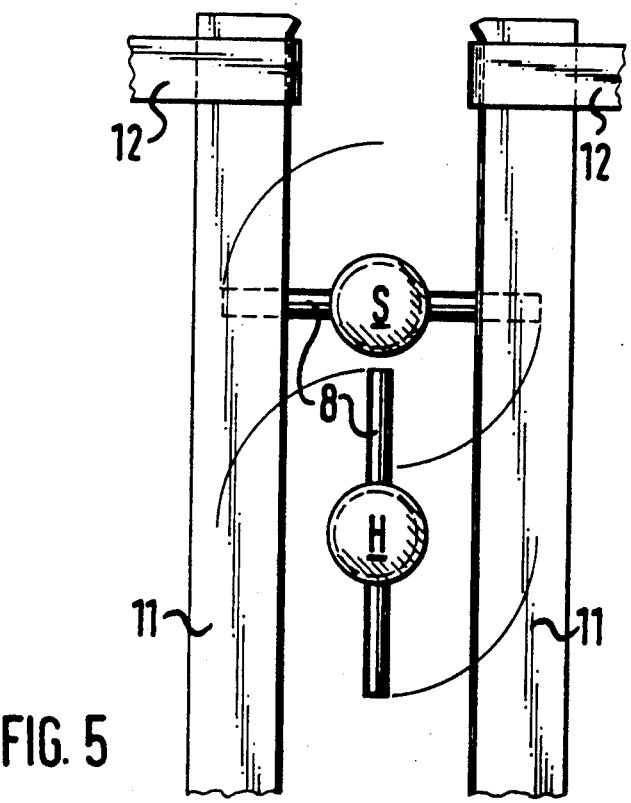
FIG. 5 is a top plan view of FIG. 4.

The vertical conveyor means at the lifting and lowering stations have a similar construction, each respectively comprising first and second columns S and H arranged in pairs at opposite sides of each carrier G. In the illustrated embodiment in FIG. 2, three adjacent lines of carriers G are arranged in the lifting and lowering stations and two pairs of columns S and H are provided at each side of each line for support of the carriers. Specifically, between adjacent lines of carriers G two pairs of columns S and H are provided and at the outer sides of the outer lines of carriers G there are two pairs of columns S and H. The columns S and H each includes integral horizontal projections 8, in the form of rods, in vertically spaced relation for supporting carriers G one above the other. Each of columns S and H is rotatably supported for reciprocal pivotal movement through an angle of 90° as diagrammatically illustrated in FIG. 5. In one position of the columns (column S in FIG. 5) the projections 8 extend laterally to operative positions for supporting the adjacent carriers while in the other position rotated at 90° (column H in FIG. 5) the projections 8 are disposed between the carriers in a withdrawn or inoperative position. The columns H are capable of being raised and lowered by a distance X in a manner and a sequence to be explained later.

The carriers G are advanced on conveyor belts 16 one after the other and a number of carriers (five in FIG. 2) are supported in adjacent relation on a support means constituted as a rigid crib 10 formed by two angle members 11 facing one another and extending along the length of each station to form the sides of the crib, and an inverted U-shape bracket 12 fixed to upright legs of angle members 11. Generally, at least two brackets 12 are provided for each crib to impart the rigidity thereof. As seen in FIG. 2, three lines of cribs 10 are provided at each station in the fermenting chamber, each crib supporting five carriers G. Hence, at each stage or level in each of lifting and lowering stations 1 and 3, there are fifteen carriers G supported on three cribs 10. The dough products (not shown) are on the carriers and travel therewith through the fermenting chamber. In FIG. 2, the carriers G are not shown in the lowering station 3 in order that the construction of the crib 10 will be clearer.

Figure 4:
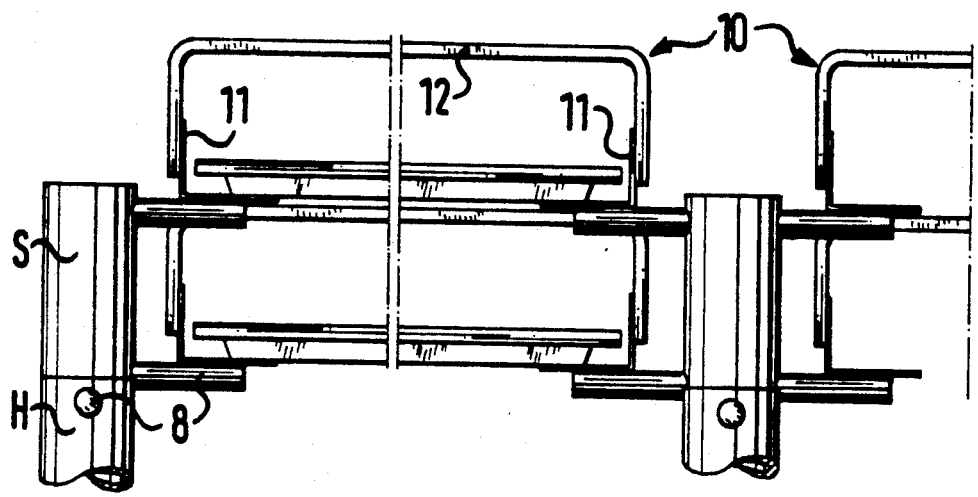
FIG. 4 is an enlarged view of a detail seen in the direction of arrow C in FIG. 2, without the carrier and guide bearings.

As evident in FIG. 2, four pairs of columns S and H are provided for each line of cribs 10 at the lifting and lowering stations 1 and 3. The columns S and H between adjacent lines of cribs have the projections 8 extending at opposite sides therefrom so that when the columns are in an operative support position for the cribs, the columns can support the cribs in the adjacent lines as evident from FIGS. 4 and 5 whereas the columns S and H at the outer sides of the outer lines of cribs have projections 8 extending only at one side thereof as these columns are only required to support the side edge of only a single line of cribs. The projections 8 are spaced vertically by a distance Y representing the vertical spacing of the cribs and the arrangement is such as to utilize substantially the entire space in each station for support of the dough products. By virtue of the maximum use of the interior space and the utilization of the projections 8 on the interior columns S and H for support of the cribs in two lines, the expenditure for the drive and advancement of the dough products is minimized.

The columns S and H of each pair are connected to respective drive means 29, in the form of pneumatic cylinders, to rotate or swivel the columns back and forth through an angle of 90°. The columns S and H are supported at the bottom by support bearings 28 and at the top by guide bearings 27. The columns H are connected to a hydraulic cylinder 30 which can lift and lower the column by the distance X. The support bearings 28 of the columns S are secured at a stationary level by a pedestal 32 mounted on the base 31 of the casing 7 whereas the support bearings 28 of columns H are mounted on base 31 via the hydraulic cylinder 30.

Figure 3:
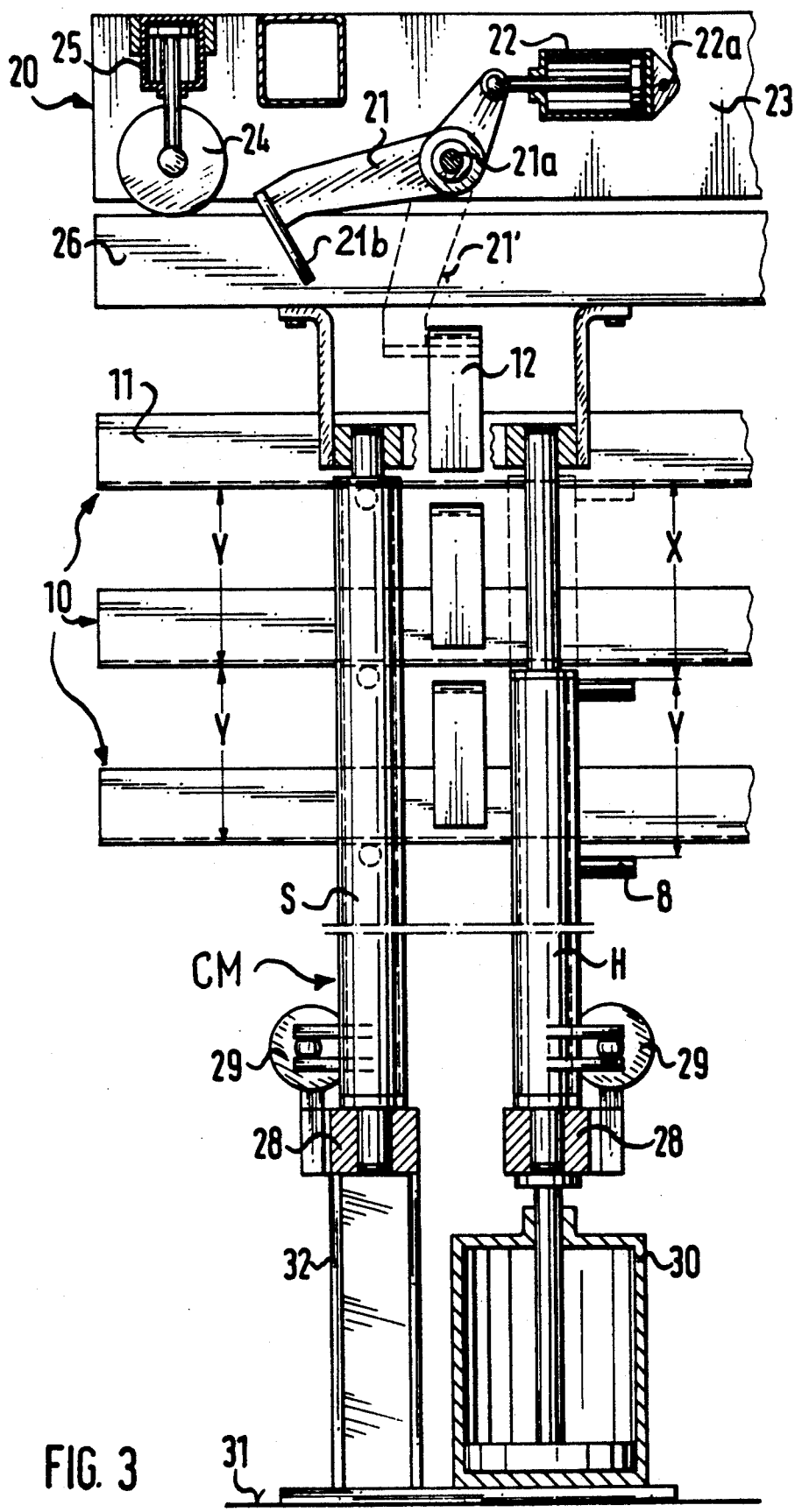
FIG. 3 is an enlarged view of a detail seen in the direction of arrow B in FIG. 2.

The conveyor 2 in the upper region of the fermenting chamber comprises a vehicle 20 having a gripping means 21 for engaging and transporting the uppermost cribs from the lifting station 1 to the lowering station 3. The vehicle 20 is supported by rollers 24 on rails 26 for travel in both directions between the lifting and lowering stations 1 and 3. The gripping means 21 is in the form of a bellcrank pivotably connected to the vehicle 20 at pivot 21a, one end of the bellcrank being provided with an engaging arm 21b for engaging beneath bracket 12 while the other end of the bellcrank is connected to a fluid cylinder 22 attached to a side wall 23 of vehicle 20 by bolts 22a. The bellcrank is pivotably moved by cylinder 22 between the retracted position shown in solid lines in FIG. 3 and the extended gripping position shown in dotted outline at 21' in FIG. 3. As diagrammatically illustrated in FIG. 1, a second gripping means 21 is provided at the opposite end of vehicle 20 to cooperate with the second bracket 12 of the crib in synchronism with the first gripping means 21. A pair of such gripping means is provided on the vehicle 20 for each crib. When both the gripping means 21 of each pair thereof are engaged beneath the brackets 12 of the associated crib, a fluid cylinder 25 is extended to raise the vehicle 20 and the topmost cribs at the lifting station 1 therewith. The vehicle 20 can then be displaced horizontally from the lifting station 1 to the lowering station 3 in order to bring the topmost cribs from the lifting station to a position at the top of the lowering station. There, vehicle 20 is lowered by cylinder 25 and the cribs 10 are lowered onto projections 8 of columns S and H at the uppermost stage of the lowering station 3. Engaging arms 21b are withdrawn from beneath brackets 12 and vehicle 20 returns to its position above lifting station 1. The cribs 10 are lowered stepwise in the lowering station 3 until the cribs reach the outlet A whereat the carriers G are pushed off the cribs onto transport belt conveyors 17 for conveyance to a baking oven (not shown). A transport conveyor 4 is located at the lower region of the fermenting chamber to transport the now empty cribs 10 back to the inlet E in readiness to receive other carriers G and repeat the operation.

The vertical transport of the cribs in the lifting station 1 will now be described in detail.

The columns S are initially in an angular position in which the projections 8 extend laterally to support angle members 11 of cribs 10 thereon. The projections 8 of the columns H extend longitudinally between the angle members 11 at a level a few millimeters below the projections 8 on columns S to provide a slight clearance.

The crib 10 is now ready to be raised one step or level in the vertical direction, and accordingly the columns H are rotated to bring their projections 8 into the transverse or crosswise position, and a lifting motion is commenced by extending hydraulic cylinder 30. The cribs 10 are lifted off projections 8 of the columns S and the columns S are rotated to their inactive position in which projections 8 extend longitudinally. The lifting motion is continued through the distance X which exceeds the distance Y by several millimeters. The columns S are rotated back to bring their projections 8 into the transverse support position. Then a lowering motion of columns H commences to cause the cribs 10 to be placed onto the projections 8 on columns S whereafter the columns H are rotated back to bring their projections into the longitudinal position. The columns H then continue in their downward movement until they have again reached the initial level. Thereby, cribs 10 are conveyed stepwise from the bottom to the top at lifting station 1 and they are then transported by vehicle 20 to the lowering station 3. A downward transport of cribs 10 is produced stepwise at lowering station 3 in a reverse sequence of the movements of the pairs of columns S and H. All stages in the lifting and lowering stations 1 and 3 are loaded with cribs 10. In this way there is a good utilization of the interior space of the fermentation chamber and a reduction of material used. Only one crib is empty, as desired, in going from the outlet A to the inlet E on conveyor 4.

In the embodiment in FIGS. 6 and 7, the fermenting chamber in casing 7 employs pallets 13 instead of cribs 10. The pallets 13 are formed as a frame which consists of cross members 14 and longitudinal members 15. The pallets 13 occupy the entire horizontal surface area of each of the lifting and lowering stations 1 and 3 in the fermenting chamber. The pallets 13 thus are as wide as the subsequent oven transport conveyor 17 so that a number of carriers G are delivered in adjoining relation to the oven without intermediate spacing and without any need for intervening handling.

Since the length of pallets 13 (measured in the direction of transport from the inlet E to the outlet A) is less than the width, the pairs of columns S and H for the vertical transport are no longer at the longitudinal sides of the vertical lines of cribs as in FIG. 1, but are arranged at the transverse front and back sides of the pallets at a spacing which produces minimum bending of the pallets 13. It is possible in this way to keep the structural height of the pallets 13 small for purposes of obtaining a high density of product in the lifting and lowering stations.

The operation of the vertical conveyor means CM in the lifting and lowering stations 1 and 3 in FIGS. 6 and 7 is the same as described for the cribs 10 in the embodiment of FIGS. 1–5. Modifications are necessary only to the extent that the support of columns S and H is not obtained directly on base 31 of casing 7, but on a transverse carrier 60 secured to the casing above the inlet E and outlet A and extending therebetween. During delivery of carriers G, the columns H are in their upper position in order to keep the inlet and outlet open. The carriers G on transport conveyor 16 are displaced onto an empty pallet 13 by means of an input pushing unit 5a. After passing through the fermenting chamber, the carriers G are displaced by a delivery pushing unit 5b onto the oven transport conveyor 17. The empty pallet 13 is conveyed back to the inlet E by conveyor 4. In the upper region of the fermenting chamber, the gripping means 21 grip under cross members 14 of pallet 13 to lift and transport the pallet from the lifting station to the lowering station.

An advantage of the embodiment of FIGS. 6 and 7 with pallets 13 is that the pallets can be supplied with different type carriers G for different shapes of dough products, for example, the carriers can be flat sheet, peal boards, boxes, baskets, or combined boxes and baskets whose length and width dimensions no longer must necessarily be uniform. The embodiment of FIGS. 6 and 7 has the further advantage that boxed products of great weight and height can be intermixed with sheets carrying flat products of low weight (which require greater surface area).

In the fermenting chamber of FIGS. 6 and 7, the height Y between stages at the lifting and lowering stations can be made small and the pallets relatively thin.

When operating with sheet carriers supporting flat products of low height and large surface area, the pallets 13 at each stage are loaded with the flat products. When operating with boxes containing tall heavy products, two pallets 13 are placed on top of one another to virtually double the distance between stages. Only every other stage of the columns S and H is loaded at the lifting and lowering stations. Because the height between stages is doubled, the usable surface area is reduced by one-half, which is consistent for the heavy, tall products.

This arrangement enables the use of the fermenting chamber with a support surface that can be doubled in the case of flat goods as compared to tall goods. The overall structural height, however, of the surrounding casing 7 is only approximately 10% greater than conventional single-purpose casings for tall, heavy products.

The loading at every other stage with two superposed pallets 13 is not shown in the drawing, as this is readily understood and can be carried out by those skilled in the art on the basis of the disclosed embodiments.

Also, the carriers G can be supplied directly onto projections 8 of the columns S and H without cribs 10 or pallets 13. In such case, the carriers must always have the same width and must be structurally stable. In the case of a direct discharge of carriers G onto the oven transport conveyor, conveyor belt 4 is unnecessary in the casing 7.

Although the invention has been described in relation to specific embodiments thereof, it will become apparent to those skilled in the art that numerous modifications and variations can be made within the scope and spirit of the invention as defined in the attached claims.

What is claimed is:

1. Apparatus for fermenting dough products comprising:
   a casing defining a fermenting chamber having an inlet for carriers on which dough products are supported and an outlet for the carriers after the dough products have passed through and have been fermented in said chamber, said chamber having a lower region including a front portion at which said inlet is located and a rear portion at which said outlet is located, a lifting station at which the carriers are lifted in said chamber from said lower region to an upper region of the chamber and a lowering station at which the carriers are lowered from said upper region to said lower region, said lifting and lowering stations extending vertically in said chamber adjacent to one another and occupying a major portion of said chamber;
   first vertical conveyor means at said lifting station for lifting said carriers stepwise from said lower region to said upper region;
   horizontal conveyor means in said upper region of the chamber for transporting said carriers from the lifting station to the lowering station;
   second vertical conveyor means at said lowering station for lowering said carriers stepwise from said upper region to said lower region;
   each of said first and second vertical conveyor means comprising a plurality of pairs of first and second columns, respectively including projections thereon in an arrangement to support the carriers respectively and individually by the first and second columns;
   means for selectively rotating the first and second columns between respective operative positions in which the projections on said columns support the carriers and inoperative positions in which the projections are withdrawn from the carriers; and
   means for raising and lowering one of said columns of said pairs.

2. Apparatus as claimed in claim 1, comprising means controlling the means for selectively rotating the first and second columns and the means for raising and lowering said one of said pairs of columns to support the carriers on the projections of said one of said pairs of columns and displace the latter vertically one step while the other of the columns is rotated to its inoperative position whereafter said other of the columns is rotated to its operative position to support the carriers and said one of the columns is rotated to its inoperative position and vertically displaced back to its initial position.

3. Apparatus as claimed in claim 2, wherein said projections on said columns are spaced vertically, said one columns being raised and lowered by a distance slightly greater than the vertical spacing of said projections.

4. Apparatus as claimed in claim 3, wherein the vertical spacing of said projections defines successive stages of the carriers at which the carriers are stepwise advanced at the lifting and lowering stations.

5. Apparatus as claimed in claim 4, comprising support means at said stages for supporting a plurality of said carriers at the lifting and lowering stations, each said support means being successively transported from the bottom of said lifting station through the fermenting chamber to the bottom of said lowering station.

6. Apparatus as claimed in claim 5, wherein each of said support means comprises a crib including transversely spaced longitudinal angle members facing one another and inverted U-shaped bracket means connecting said angle members together.

7. Apparatus as claimed in claim 6, wherein a plurality of said cribs are disposed in adjacent, transverse relation in each of said lifting and lowering stations.

8. Apparatus as claimed in claim 7, wherein selected pairs of columns are disposed between adjacent cribs, said selected pairs of columns including said projections extending from opposite sides of said columns so that said adjacent cribs are supported by the projections on said selected pairs of columns.

9. Apparatus as claimed in claim 6, wherein said horizontal conveyor means comprises gripping means for engaging said bracket means to lift the uppermost crib at the lifting station and transport said crib to the top of the lowering station and release the same thereat.

10. Apparatus as claimed in claim 5, wherein each of said support means comprises a pallet having length and width dimensions to extend over substantially the entire surface area of each of said lifting and lowering stations.

11. Apparatus as claimed in claim 10, wherein said pairs of columns are arranged in transversely spaced relation at transverse sides of said pallets.

12. Apparatus as claimed in claim 11, comprising means located at a level above said inlet and outlet for supporting said columns above said inlet and outlet to enable said pallets to be supplied to said lifting station and removed from said lowering station.

13. Apparatus as claimed in claim 12, comprising pusher means for pushing a plurality of carriers onto one said pallet located at the bottom of said lifting station, said plurality of carriers extending over the entire width of the pallet, and further pusher means for pushing said carriers from said one pallet through said outlet after said one pallet has traversed said fermenting chamber and is located at the bottom of said lowering station.

14. Apparatus as claimed in claim 1, wherein said means for selectively rotating said first and second columns comprises pneumatic drive means.

15. Apparatus as claimed in claim 1, wherein said means for raising and lowering said one of said columns of said pairs comprises hydraulic drive means.

* * * * *